United States Patent
Deptuck et al.

(10) Patent No.: US 12,307,226 B2
(45) Date of Patent: May 20, 2025

(54) APPARATUS, SYSTEM AND METHOD FOR APP DISCOVERY AND INSTALLATION

(71) Applicant: Universal Electronics Inc., Scottsdale, AZ (US)

(72) Inventors: Curtis Deptuck, Scottsdale, AZ (US); Nicu Ahmadi, San Francisco, CA (US); Prasanna Moodlamakki Prabhakara, Bangalore (IN); Sarika Desai, Bangalore (IN)

(73) Assignee: Universal Electronics Inc., Scottsdale, AZ (US)

( * ) Notice: Subject to any disclaimer, the term of this patent is extended or adjusted under 35 U.S.C. 154(b) by 138 days.

(21) Appl. No.: 17/688,414

(22) Filed: Mar. 7, 2022

(65) Prior Publication Data
US 2023/0280993 A1   Sep. 7, 2023

(51) Int. Cl.
*G06F 8/61*   (2018.01)

(52) U.S. Cl.
CPC ..................... *G06F 8/61* (2013.01)

(58) Field of Classification Search
CPC ............. H04L 12/2807; H04L 67/10
See application file for complete search history.

(56) References Cited

U.S. PATENT DOCUMENTS

| | | | |
|---|---|---|---|
| 10,063,625 B2 | 8/2018 | Arling et al. | |
| 10,904,722 B2 | 1/2021 | Klein | |
| 11,474,801 B1 * | 10/2022 | Karppanen | G06F 8/61 |
| 2009/0058618 A1 | 3/2009 | Gopalan | |
| 2012/0131324 A1 | 5/2012 | Ansari | |
| 2014/0216071 A1 | 8/2014 | Broadbent | |
| 2018/0041591 A1 * | 2/2018 | Yoden | H04L 12/2814 |
| 2018/0167762 A1 | 6/2018 | Hatambeiki | |
| 2020/0211721 A1 * | 7/2020 | Ochoa | G16Y 10/75 |

FOREIGN PATENT DOCUMENTS

CN   104363578 A   8/2018

OTHER PUBLICATIONS

International search report and written opinion of international application No. PCT/US2023/063783, dated Sep. 26, 2023, 14 pp.
Extended Search Report from European application No. 23767585.5, dated Mar. 28, 2025, 10 pp.

* cited by examiner

Primary Examiner — Hsiungfei Peng
(74) Attorney, Agent, or Firm — Greenberg Traurig, LLP (57) ABSTRACT

Information obtained from a smart device is used to determine a unique identity for the smart device. The identity for the smart device is then used to locate installed app information for the smart device. Data for installing one or more apps corresponding to the installed app information for the smart device is then provided to a setup app to thereby facilitate installation on the centralized, host device of the one or more apps corresponding to the installed app information for the smart device.

8 Claims, 5 Drawing Sheets

APPARATUS, SYSTEM AND METHOD FOR APP DISCOVERY AND INSTALLATION

BACKGROUND

Communication and entertainment devices such as cellular phones, tablet computers, e-books, hand-held games, portable media players, personal digital assistants (PDAs), televisions (TVs), etc. are known in the art as smart devices. Smart devices generally include features such as graphical user interfaces on color touch screens, Bluetooth, WiFi, and/or other networking capability, etc. Many such devices also incorporate support for ancillary applications (hereafter referred to as "apps").

Example apps include apps for supporting calendars, email, games, social media interfaces, maps, navigation, and the like. Apps may additionally include remote control apps. Remote control apps are used to control other appliances in the home (also referred to herein as controllable devices or controllable appliances). In general, apps may be used to control the state of a controllable appliance, to interact with further apps installed on a controllable appliance, such a media server provider apps, etc.

Typically, the end user of a controllable, entertainment device is required to interact with a cloud based server to locate and install an app on a smart device, such as a cell phone, tablet, PDA, computer, etc. However, in some instances, such as described in U.S. Pat. No. 10,063,625, the disclosure of which is incorporated herein by reference in its entirety, a system and method may be used to automatically provision an app to a smart device for use in connection with a controllable appliance. A presence of the controllable appliance on a wireless network which includes the smart device is detected and data received from the controllable appliance is used to initiate a retrieval of the app. When the retrieved app is installed on the smart device, the app is usable with the smart device to provide at least an interface between the smart device and the controllable appliance. In some circumstance, installation of the app on the smart device may also include causing the app to be synchronized with a corresponding app that was prior installed on another smart device capable of communicating with the controllable appliance.

In further instances, a system may function to recommend apps to the end user for installation on a smart device as described in US Patent No. 10,904,727, the disclosure of which is incorporated herein by reference in its entirety. In such a system a smart device gathers information of appliances and apps that have been installed onto the smart device and provides this information to a remote server. The remote server compares the information sent by the smart device to an identification of promoted apps received from a remote source to identify apps that are not installed on the smart device that are included in the identification of promoted apps. The remote server then notifies the smart device of which apps in the identification of promoted apps are not installed into the smart device, so that a user of the smart device may choose to have the missing app installed thereon.

While these automated systems generally work for their intended purpose, because the machine learning models upon which these systems rely are extremely complex, it is seen that appliance identifications, app identifications, app suggestions, etc. often suffer from unwanted bias. In addition, these system do not address the problem of apps being distributed amongst various smart devices and controllable appliances within a system.

SUMMARY

To solve these and other problems, the following describes example apparatus, systems, and methods for providing app discovery and installation. The apparatus, systems, and methods rely upon models that are constructed to reduce complexity while maintaining high performance. The models also allow one to apply knowledge that can be optional and not applicable to all cases. By using such models, the apparatus, systems, and methods will be able to better predict apps, such as original equipment manufacturer (OEM) apps, for installation on a smart device by using the signature of each discovered device. The apparatus, systems, and methods will then allow a user to (or automatically function to) install these apps on a smart device, for example, to cause OEM apps used to control a controllable appliance to be installed on a single, mobile smart device and/or to cause apps used to access media services to be installed on a centralized smart device within the home, such as a TV or set-top box.

A better understanding of the objects, advantages, features, properties and relationships of the subject apparatus, systems, and methods will be obtained from the following detailed description and accompanying drawings which set forth illustrative examples and which are indicative of the various ways in which the principles of the invention hereinafter claimed may be employed.

BRIEF DESCRIPTION OF THE DRAWINGS

For a better understanding of the various aspects of the described systems and methods, reference may be had to the illustrative examples shown in the attached drawings in which.

DETAILED DESCRIPTION

Figure 1:
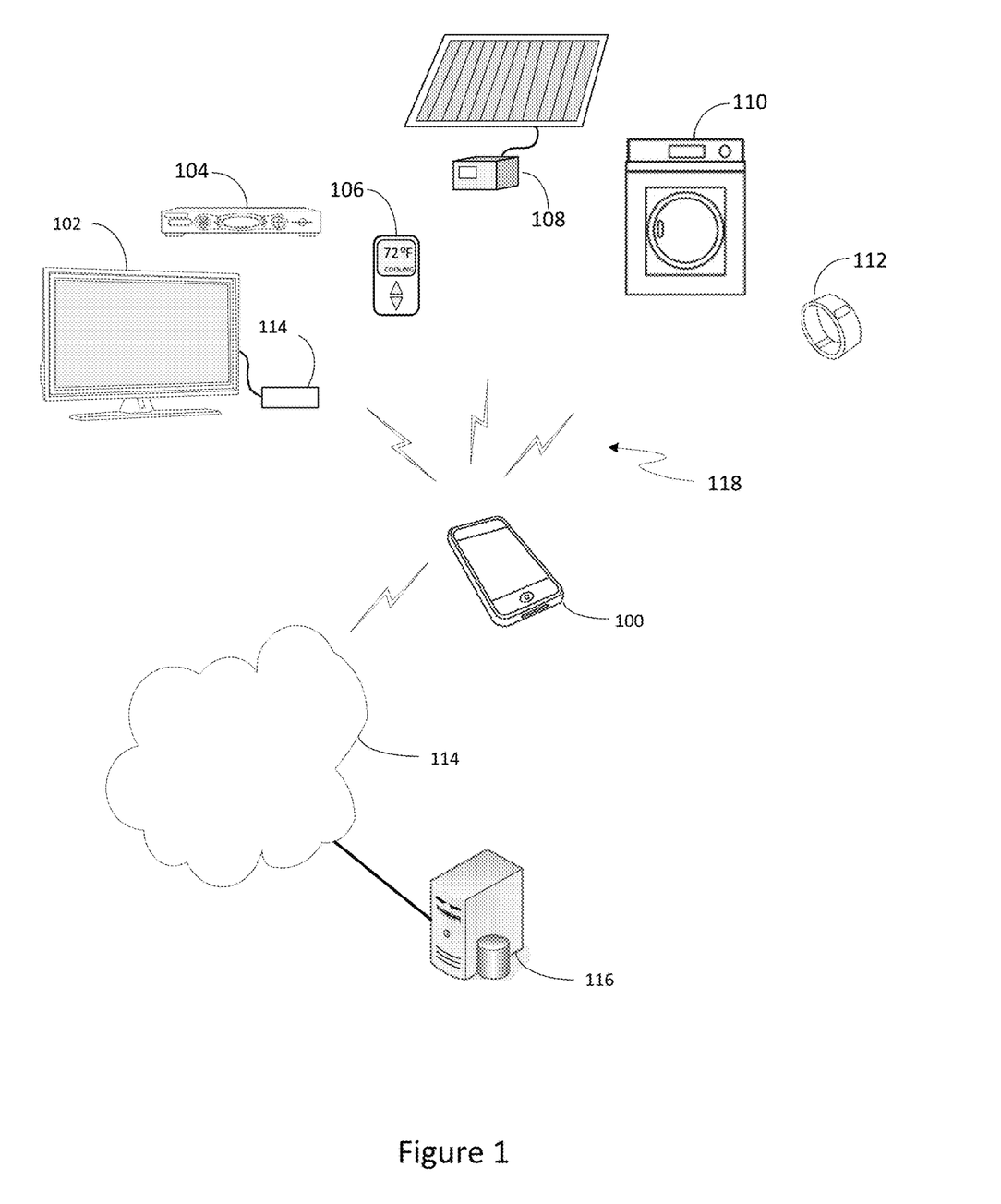
FIG. 1 illustrates an example system in which an app-equipped smart device may be utilized to interface with one or more appliances.

With reference to FIG. 1, there is illustrated an exemplary system in which apps, to be installed on a smart device 100 in accordance with the descriptions that follow, may provide interfaces to various controllable appliances, such as, for example, a television ("TV") 102, a cable or satellite set top box ("STB") 104, a thermostat 106, a solar power array controller 108, a clothes washer and/or drier 110, a personal fitness tracker or pedometer 112, a media streaming device 113, such as a "ROKU" brand media streamer device, connected to the TV 102 via used of an HDMI cable, etc. The interfaces may be used to display information relevant to the operation and/or states of such devices, to communicate with and/or control such devices, etc. To this end, all of these appliances may communicate with smart device 100 using an available local wired or wireless network 118 such as, for example, WiFi, Bluetooth, Zigbee, etc., or any other convenient means. It will be appreciated that depending on the particular networking technology in use various other items such as access points, routers, Internet gateways, etc., may be required in order to fully implement the illustrative network 118. Still further, the various devices can be coupled via use of the Internet 114. In the interests of clarity, device used to facilitate communications via such local and/or wide area networks are omitted from FIG. 1.

It should be appreciated that, while an exemplary embodiment is presented herein in terms of a group of household and/or personal appliances 102 through 113, the methods described herein may broadly apply to any group of devices, appliances, or equipment (used interchangeably herein) the elements of which support app driven user interfacing, for example without limitation those as may be found in offices, factories, schools, theaters, etc. Accordingly the examples described hereafter are intended to be illustrative and not limiting.

Figures 2A, 2B, 2C:
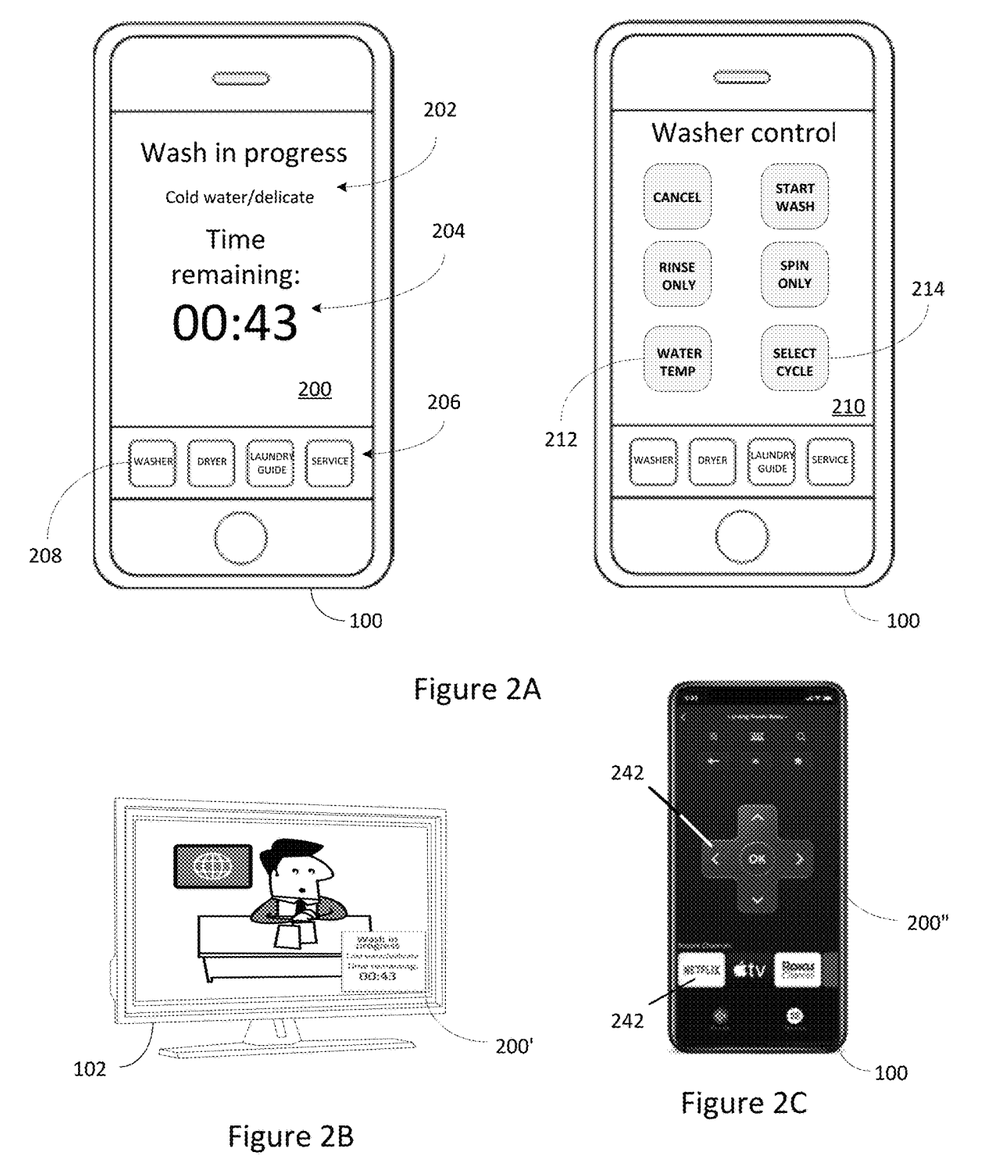
FIGS. 2A, 2B, and 2C illustrate example smart device apps, with their generated user interfaces, appropriate for interacting with one of the appliances of FIG. 1.

Turning now to FIG. 2A, an exemplary user appliance interface 200 provided by a original equipment manufacturer ("OEM") supplied app installed on a smart device 100 is shown by way of illustration. When invoked by a user of the smart device 100, such an interface 200 may display a current status of the appliance, in this illustrative example that of a clothes washer, including such example items as the wash cycle currently being performed 202 and time remaining 206. User interface 200 may also include an exemplary user input area 206 with icons that are activable to access a companion appliance (e.g., a clothes dryer), GUIs, user guides, troubleshooting diagnostics, etc., as well as an icon 208 which may access additional page(s) 210 of the current device GUI, for example to cancel the current operation, initiate other operations, or to invoke further submenus such as selection of water temperature 212 or fabric cycle 214. As illustrated by way of further example in FIG. 2B, an exemplary appliance app GUI 200' may be adapted as appropriate for use with other types of smart devices, for example a "smart TV" 102, where a controlling device (or app) configured to communicate with the appliance 102 is also used to interact with the app/GUI 200'.

By way of still further example, an app for interacting with the "ROKU" media streaming device 113 provided by media streaming device manufacturer "ROKU" for installing on a smart device 100 is illustrated in FIG. 2C. The user interface 200" provided by this app includes input elements 240 for causing the smart device 100 to issue commands to control operations of the "ROKU" media streaming device 112, such as commands for navigating menus, for playing/pausing media, etc. In addition, the user interface 200" includes input elements 242 for causing the "ROKU" media streaming device 112 to access specific media service providers, such as "NETFLIX," "APPLE TV," etc. As will be appreciated, the corresponding media service provider apps, e.g., the "NETFLIX" app, the "APPLE TV" app, etc., would be installed on the "ROKU" media streaming device 112 to thereby be invokable in response to such user interface elements being activated, e.g., by a user issuing commands to navigate to the app and a command to select the app. In some instances, the app can also be programmed/configured to allow commands to be issued to still further devices, e.g., the app can be configured to cause the smart device 100 to transmit volume control commands to the TV 102 in response to volume control input elements of GUI 200" being interacted with by a user.

Figure 3:
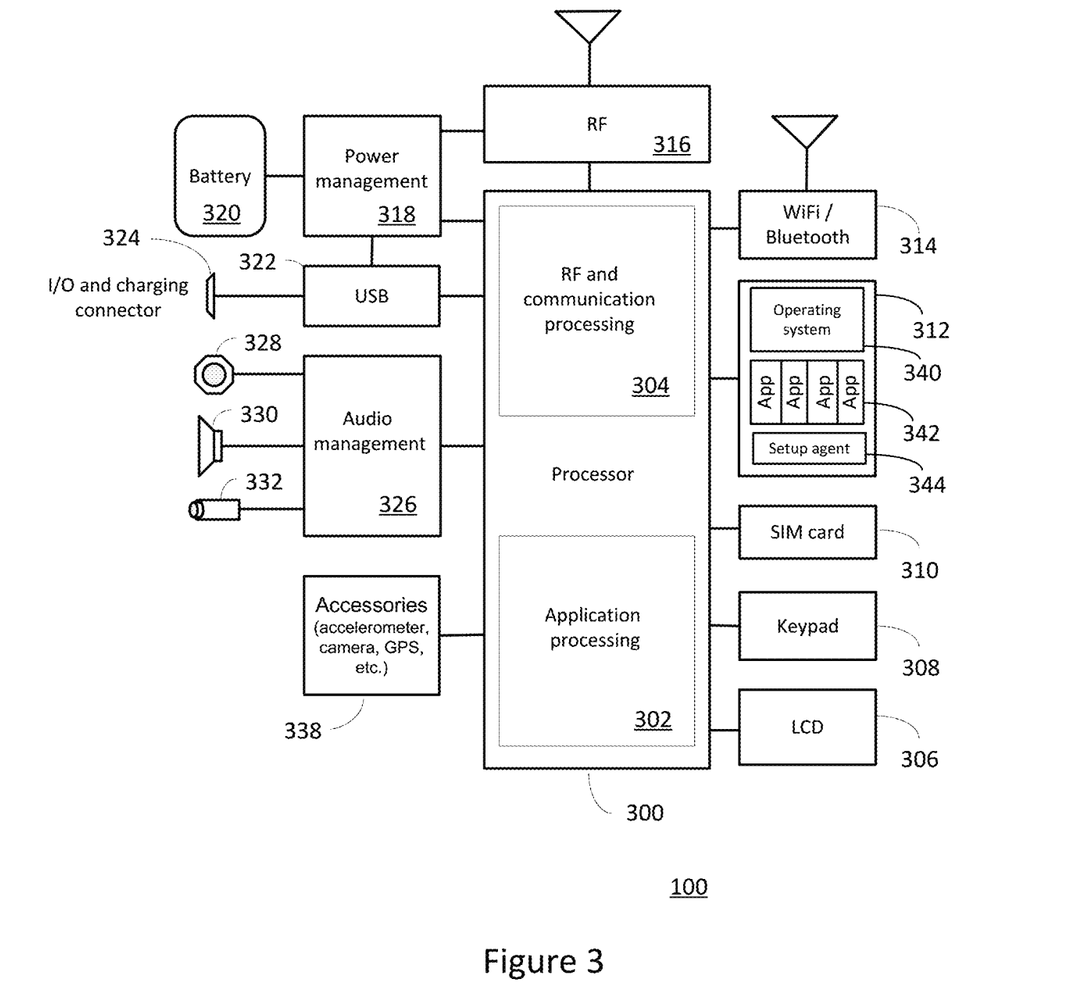
FIG. 3 illustrates in block diagram form an exemplary smart device which may be used in the exemplary systems of FIGS. 1 and 2A.

With reference to FIG. 3, the smart device 100 of FIGS. 1 and 2A-C may include as needed for a particular application, processing means 300 which may comprise both an application processing section 302 and an RF/communication processing section 304; an LCD display 306; a keypad 308 which may comprise physical keys, touch keys overlaying LCD 306, or a combination thereof; a subscriber identification module (SIM) card 310; memory means 312 which may comprise ROM, RAM, Flash, or any combination thereof; WiFi and/or Bluetooth wireless interface(s) 314; a wireless telephony interface 316; power management circuitry 318 with associated battery 320; a USB interface 322 and connector 324; an audio management system 326 with associated microphone 328, speaker 330 and headphone jack 332; and various optional accessory features 338 such as a digital camera, GPS, accelerometer, etc. Programming may be provided and stored in memory means 312 to control the operation of smart device 100 by way of operating system 340 software such as for example iOS, Android, Linux, Web apps, etc., which operating software may support the download and execution of various add-on apps 342 as necessary for a particular purpose. As noted above, a setup agent software 344 is also provisioned to smart device 100 in order to facilitate detection, installation, and operation of manufacturer-supplied appliance interface apps as well as app installed on such appliances, as will be described in further detail herein. It is also to be understood that, while the illustrated smart device 100 is particularly adapted to receive input via use of a keypad and/or touchpad display that is provided as an integral part of the smart device 100, the smart device 100, or other like smart devices such as the TV illustrated in FIG. 2B, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 4:
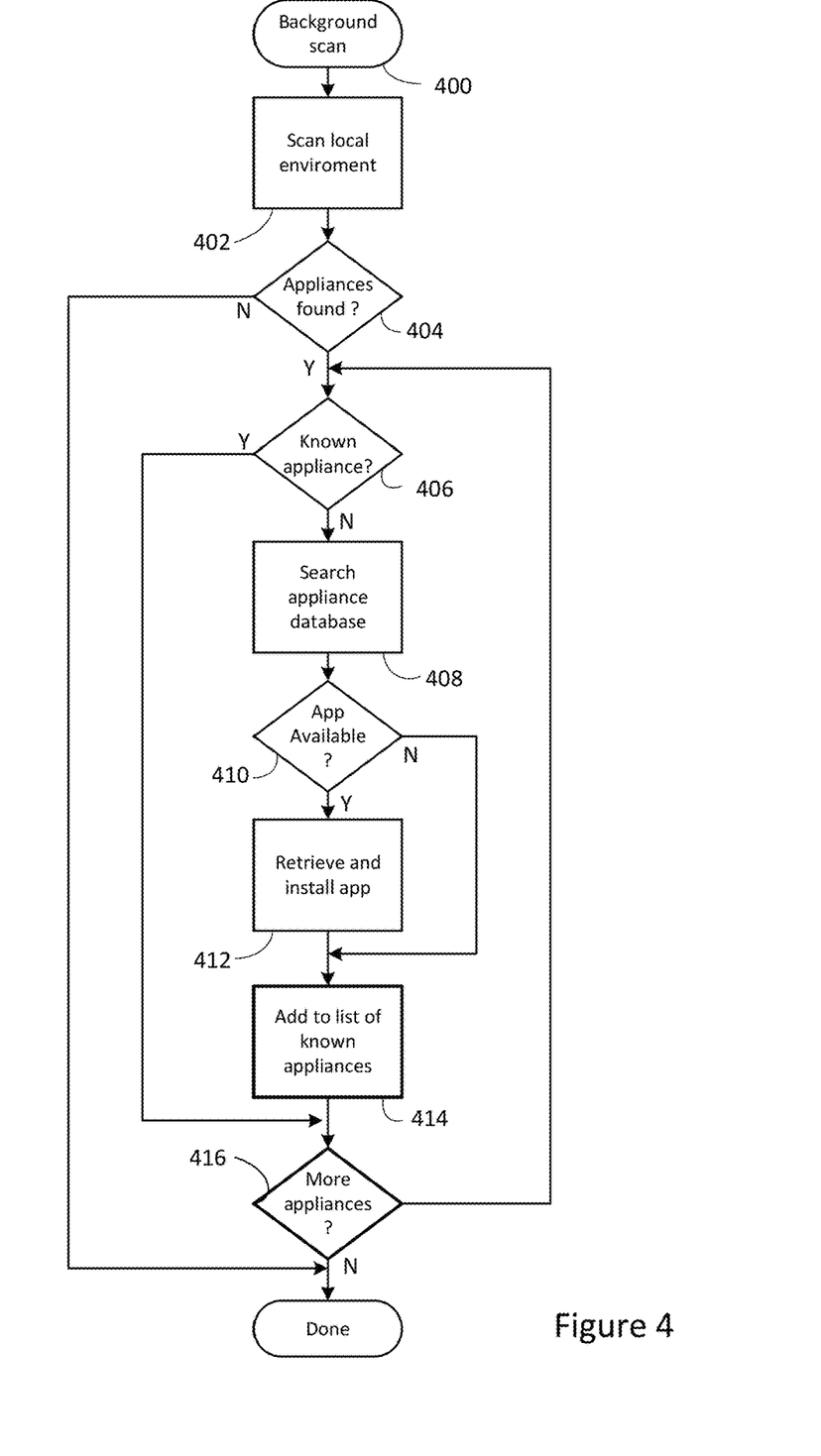
FIG. 4 illustrates in flow chart form an exemplary series of steps carried out by a smart device setup agent upon detection of a network enabled appliance in its environment.

With reference now to the flowchart of FIG. 4, at step 400 the setup agent 344 may periodically initiate a scan 402 of its current wired or wireless, network environment (e.g., WiFi, Bluetooth, etc. or any combination thereof) in order to ascertain the presence of one or more networked appliances. This action may be initiated automatically (for example based on a timer which is used to measure predetermined periods of time, in response to the device being turned on, in response to a detected change in location of the smart device using for example its GPS or the like type of functionality, etc.), or when connecting to new networks, or may be manually initiated by a user of smart device 100 (for example in response to an activation of a user input element, in response to the smart device 100 being moved, etc.) as appropriate for a particular embodiment. If it is determined at step 404 that no responsive appliances are present in the environment, the setup agent actions may be complete for purposes on appliance detection. If, however, responsive devices are detected on the wireless network, e.g., a device responds with data that can be used to predict an identity of the appliance in response to a polling request message sent from the smart device 100, then at step 406 the setup agent may next determine, using the information received, if a responsive appliance is already known to the setup agent, e.g., determine if the appliance has already been detected during a previous detection operation or otherwise manually indicated to the smart device 100. Such a determination may be made, for example, by consulting a setup agent-administered listing of appliance identities, maintained as will be described hereafter at step 414. If the appliance is already known to the setup agent, processing continues at step 416 to determine if further responsive appliances have been detected. In the event the setup agent does not recognize the appliance as being an appliance that has been previously detected, the setup agent will proceed to seek to determine the identity of the appliance.

For determining an identity of an appliance, the subject systems and methods may utilize one or more machine learning (ML) processes. As will be appreciated by those of skill in the art, the machine learning processes rely upon the use of one or more trained models that will function to predict an identity of an appliance, particularly an identity that is useful for configuring a controlling device to control functional operations of an appliance, based on data that is provided to the ML processes. Thus, by providing to the ML processes some or all of the same types of data that were used to train a model, such as an appliance ID, brand name, model number, name, parameters associated with a communication methodology supported by the appliance, and the like without limitation, the ML processes can predict the identity of the appliance. Once the identity is predicated via use of the collected signature data, the identify can be used to provision a controlling device with a command code set appropriate for controlling functional operations of the appliance, to provision a user interface to the controlling device for use controlling the appliance, and, in keeping with the disclosure set forth herein, to provision a controlling device with an OEM app for use in controlling the appliance and/or to configure a further appliance with one or more of the apps installed on the identified appliance.

To address possible problems associated with the obtaining of inconclusive or inaccurate results, the accuracy of a predictive engine can be improved by combining the data maintained in a Device Knowledge Base with the signature information collected from an appliance and by then applying post processing filtering utilizing data that was not trained as part of the original model. By utilizing non-trained data on top of a response from a prediction provided by a supervised or unsupervised model, the non-trained data can cause inclusion or exclusion of specific attributes within the predicted outcome/values thus drastically increasing the accuracy of the process.

By way of further example, it is contemplated that a model may be trained using a large collection of appliance related data (such a described above) but data which is not comprehensive worldwide. This model, built using the non-geo specific appliance related data, can be used to obtain an initial prediction and the prediction can then be filtered using known regional biases to obtain a final prediction. While the geo specific data was not used to train the model because it is incomplete, i.e., many products in the world are known but all the regions and countries the products may exist in at all times is not known, the geo-specific data can nevertheless be used to boost or filter the generalized predictions made by the ML model.

It is also contemplated that untrained data can be used to post process a prediction in scenarios where the data used to train the ML model is seemingly unrelated and/or is not always present or strongly correlated. For instance, an initial prediction may be made with a device fingerprint that results in an ambiguous device detection. In such a case, knowledge unused during the model training process, e.g., knowledge that an identified user is interacting with the device and/or the system that includes the device, knowledge that a user is interacting with a device in a specific language, etc. can be used to exclude some or all of those ambiguous results thereby providing a greatly improved or correct answer. It will also be appreciated that data that was not used to train a ML model can be used as a means of compounding recursive predictions and/or the output of one or more predictions could be used to boost or exclude outputs of another model, e.g., a signal prediction can be combined with a device fingerprint prediction and the overlapping results can be further filtered with geographical knowledge or linguistic knowledge (such as determined based upon frequent recurring word usage by a user) to produce a far more relevant final prediction than a scalar prediction could provide.

Continuing on with FIG. 4, when the identity of a newly responsive appliance has been satisfactorily or finally predicted, then at steps 408 and 410 the setup agent may next determine if an OEM app is available for that appliance. The OEM app may provide a smart device 100 with the commands/protocols needed to control the appliance, a user interface for causing such commands to be issued to the appliance (and possibly other appliances), a user interface for displaying appliance states/information, and/or the like without limitation. Such a determination may be made, for example, by using the predicted device identifying information to search for OEM app information in a database operated by the appliance manufacturer, by a third party (such as an "app store"), by a social network which may contain related app information updated by other users, and/or by searching any other database that functions to cross-reference appliance identifying data as would be predicted by the one or more ML models (e.g., data indicative of a manufacturer and model number) to available apps and locations from which such apps may be download. It will also be appreciated that such a database may be stored in local memory 312 as part of the setup agent programming, may be located at a cloud based data storage facility or server 116, or a combination thereof, as appropriate for a particular embodiment.

If no app is available, processing continues at step 414, adding the instant appliance identity to the listing of known appliance identities whereupon the appliance identity can be periodically used by the system to recheck to see if an OEM app is available as desired. If it determined that an OEM app is available, at step 412 the appropriate OEM app may be recommended to the user or may be downloaded to the smart device 100 from a location indicated in the database entry, e.g., a location pointed to by use of a URL, IP address, etc. In connection with this process, the system may use appliance identification information associated with the smart device upon which the OEM app is to be installed to ensure that an app appropriate for that platform is identified and retrieved, e.g., that an OEM app appropriate for an "Android" smart device or an "iOS" smart device is identified and retrieved. The availability of an OEM app may be displayed to a user by way of message caused to be displayed in a TV screen, by having a voice enabled device introduce a user to a new app, etc.

As will be appreciated, depending on the particular implementation a download and install of an app may be performed automatically by the setup agent, or the agent may first present the download possibility to the user of a smart device 100 for confirmation. In those instances where the app download is sourced from a site which requires user sign-in and/or authentication, such as for example the "iTunes" brand store or "Android Marketplace" brand store, user credentials may be pre-loaded into the setup agent program to facilitate such automatic download, or may be requested from the smart device user each time download is to be performed.

When an OEM app is downloaded and installed, in some embodiments the setup agent may register that app with a cloud based service, by way of forwarding unique identity information regarding the app and the environment (e.g., network and/or app owner information) in which it is operational to a server system such as for example the server 116 of FIG. 1. Such registration information may be subsequently utilized for the purpose of synchronizing multiple instances of the same app across different OS's as desired, for allowing corresponding apps to be installed on a centralized host device, etc. In addition, the setup agent may, in conjunction with the installation of certain apps which require specific equipment configurations, also generate macro command sequences as necessary to place various appliances into the required state upon initiation of the app. By way of illustration without limitation, a OEM app for a media device may require that a TV 102 to be turned on, set to a particular input, etc., in which case a command sequence (also referred to as a "macro") may be created by the setup agent to be executed every time that app is initiated. Since methods for control of entertainment appliances and/or use of macros are well known in the art, these will not be discussed further herein, however for additional information the interested reader may turn to for example U.S. patent application Ser. No. 13/657,176 "System and Method for Optimized Appliance Control" or U.S. Ser. No. 13/071,661 "System and Method for Facilitating Appliance Control via a Smart Device", both of common ownership and both incorporated herein by reference in their entirety.

At step 414 and as previously noted, the setup agent may add the current appliance identity into a local and/or cloud-based tabulation of known appliances. Such an identity may comprise a serial number, MAC address, or any other data value suitable to uniquely identify the appliance. Thereafter, at step 416 the setup agent may ascertain if additional responsive appliances were detected and, if so the process described above is repeated, until all responding appliances have been accounted for.

In some embodiments, provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated OEM app is deleted by the user of the smart device; etc.

Once a new appliance is discovered per the above, the system may additionally attempt to auto-install (or suggest the installation of) one or more of the apps further determined to be installed on the discovered device on a new host device. For example, the setup app may determine the apps installed on a newly discovered media streaming device and cause those apps to be installed (if not already installed) on a centralized, host device, such as a smart TV device, within the system. The host device on which discovered apps are to be installed would typically be a device that is different in brand and sometime type as compared to the device(s) from which the apps are discovered. Once installed, the system may further synchronize the apps as needed and/or desired by a user.

Figure 5:
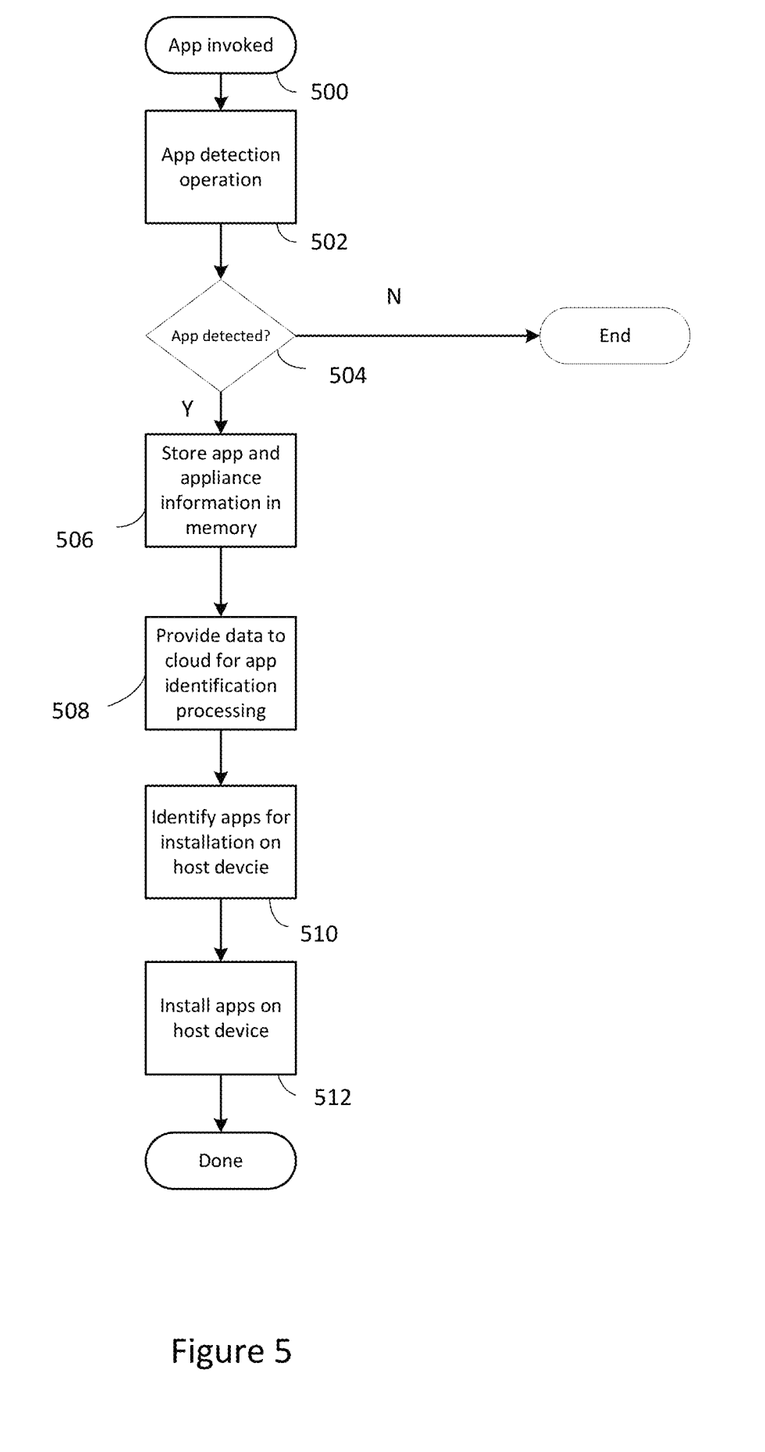
FIG. 5 illustrates in flow chart form an exemplary series of steps carried out by a smart device setup agent to install on a centralized device apps installed across multiple appliances.

As shown in FIG. 5, the appliance detection and OEM app installation process may additionally include an app discovery process. The app detection and associated app installation process may also be performed separately from the appliance detection process. In either case, the app detection and associated installation operation may use information obtained via an appliance detection process, provided by a user, or otherwise obtained.

More particularly, upon being invoked at step 500, either automatically at one or more predetermined times or upon the occurrence of one or more events (for example, upon receiving the discovered connected device information in step 402), or manually, for example in response to receiving a command from the remote control 102, the setup app will initiate an app detection operation 502. The app detection operation is intended to identify apps presently installed on other smart devices, such as the devices that were detected in step 402. In a preferred example, the detected apps will be installed on a centralized smart device, such as a smart TV.

For determining app installation, each smart device having an app installed therein may be caused to/requested to provide information related to each installed app, such as one or more of an app developer identification, a hardware platform identification, (e.g., a Roku brand media player, Apple TV brand media player, Amazon Fire brand media player, etc.), an app name, a version number, an app category, an app objective (e.g., to share photos, discover new music, etc.), a target audience (e.g., avid readers, awesome parents, etc.), a user profile which may include app authentication data, etc. This discovered app information may comprise one or more parameters or characteristics which may differ from app to app and from device to device. For example, by this process, a setup app may determine that a media streaming device contains installed apps such as an "ABC" network brand app, a "Discovery Channel" brand app, a "Hulu" brand app, a "Pandora" brand app, a "DirecTV" brand user profile and viewing history, etc. The "DirecTV" brand user profile in this example would comprise the user's on-line service account information associated with a particular media service, such as the "DirecTV" brand service provider in this case, account log-in information, authentication data and end user identity information. The user identity information may include but is not limited to, on-line account data and/or account log-in authentication, associated cloud based authentication data, name, location address, IP address, digital identity, login information, gender, telephone number, preferences, web cookies, personal data located in a smart device, etc., which may reside in a multitude of locations. App install information may also be obtained from and/or verified using information obtained from a cloud-server device at which app install information for the devices within the local are network of the user is maintained as discussed herein.

At step 504, if no new apps are discovered from the app detection operation in step 502, the method ends, and the smart device hosting the setup app resumes normal operations. If one or more apps are discovered, the setup app may cause the collected information to be stored 506 in memory 304, at a cloud server, and/or at another, associated memory device, preferably in association with each smart device that each app is installed.

At step 508, the gathered information is provided to a cloud server for processing. At the cloud server, the gathered information is used 510 to identify the apps, identify from where the apps can be obtained (e.g., from a media source site, from a third party site such as an "app store," or the like), etc. For identifying from where the apps can be obtained, the system will also need to know information about the host appliance upon which the apps are ultimately to be installed, in particular the operating system and operating system version being used by the host appliance. This information can be provided to the system by the user, can be obtained by a device discovery process as detailed above, or the like without limitation. In certain circumstances, the system may further have a particular type (and sometimes a particular brand) of device pre-designated as being the host device upon which the apps are to be installed or a user may be required to designate the host device. In additional circumstances, the system may be provided with ordered preferences to choose a particular type (and sometimes brand) of device as being the host device, e.g., to use a STB if present, if not, to use the TV; to use a "Sony" brand device if present, if not, to use a TV; etc.

As before, depending on the particular implementation such a download and install 512 may be performed automatically by the setup agent, or the agent may first present the download possibility to the user of smart device 100 for confirmation in those instances where the app to be download is sourced from a site which requires user sign-in and/or authentication, such as for example the "iTunes" brand store or "Android Marketplace" brand store, user credentials may be pre-loaded into the setup agent program to facilitate such automatic download, or may be requested from the smart device user each time download is to be performed. To this end, data for installing the one or more apps can be a pointer to a repository from which the app may be obtained or it may be the app install bundle itself.

When a host appliance appropriate app is located, downloaded and installed onto the host appliance, in some embodiments the setup agent may register that app with a cloud based service, by way of forwarding unique identity information regarding the app and the environment (e.g., network and/or app owner information) in which it is operational to a server system such as for example the server 116 of FIG. 1. Such registration information may be subsequently utilized for the purpose of synchronizing multiple instances of the same app across different OS's if needed and as desired. In addition and as described previously, the setup agent may, in conjunction with the installation of certain apps which require specific equipment configurations, also generate macro command sequences as necessary to place various appliances into the required state upon initiation of the app.

As noted above, in some instances, rather than or in conjunction with a device reporting installed apps, the system may gather app install information from one or more cloud to the extent the server would have access to app install information that is stored in a database in association with device identifier information, user information, home network identifier information, or any other information that would allow an app that is to be installed on a host device to be cross referenced to a user or devices used by the user.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer-readable media having stored thereon instructions wherein the instructions, when executed by a processing device, perform steps for causing one or more apps installed on a smart device to be installed on a centralized, host device, the steps comprising:
   receiving information obtained from the smart device;
   using the information obtained from the smart device to determine a unique identity for the smart device;
   using the unique identity for the smart device to locate installed app information for the smart device;
   using an identity for the centralized, host device to locate installed app information for the centralized, host device;
   comparing the installed app information for the smart device and the installed app information for the centralized, host device to determine one or more apps installed on the smart device that are not installed on the centralized, host device; and
   causing data for installing the one or more apps determined to be installed on the smart device that are not installed on the centralized, host device to be provided to a setup app to thereby facilitate installation on the centralized, host device of the one or more apps determined to be installed on the smart device that are not installed on the centralized, host device.

2. The non-transitory, computer-readable media as recited in claim 1, wherein the setup app is installed on the centralized, host device.

3. The non-transitory, computer-readable media as recited in claim 1, wherein a machine learning process uses the information obtained from the smart device to determine the unique identity for the smart device.

4. The non-transitory, computer-readable media as recited in claim 3, wherein linguistic data obtained from the smart device is further used to filter or augment results obtained by the machine learning process to determine the unique identity for the smart device.

5. The non-transitory, computer-readable media as recited in claim 3, wherein geographic data obtained from the smart device is further used to filter or augment results obtained by the machine learning process to determine the unique identity for the smart device.

6. The non-transitory, computer-readable media as recited in claim 1, wherein the instructions use appliance identifying information for a plurality of appliances within a local area network that includes the smart device to determine from amongst the plurality of appliances the centralized, host device.

7. The non-transitory, computer-readable media as recited in claim 1, wherein the instructions use the identity for the centralized, host device to determine from where the one or more apps determined to be installed on the smart device that are not installed on the centralized, host device may be obtained.

8. The non-transitory, computer-readable media as recited in claim 7, wherein the identity for the centralized, host device is indicative of an operating system being used by the centralized, host device.

* * * * *